US008705875B1

(12) United States Patent
Ricanek, Jr.

(10) Patent No.: US 8,705,875 B1
(45) Date of Patent: Apr. 22, 2014

(54) DEMOGRAPHIC ANALYSIS OF FACIAL LANDMARKS

(75) Inventor: Karl Ricanek, Jr., Wilmington, NC (US)

(73) Assignee: University of North Carolina at Wilmington, Wilmington, NC (US)

(*) Notice: Subject to any disclaimer, the term of this patent is extended or adjusted under 35 U.S.C. 154(b) by 224 days.

(21) Appl. No.: 13/226,756

(22) Filed: Sep. 7, 2011

Related U.S. Application Data

(60) Provisional application No. 61/380,542, filed on Sep. 7, 2010.

(51) Int. Cl.
*G06K 9/62* (2006.01)
*G06K 9/46* (2006.01)

(52) U.S. Cl.
USPC ............................ 382/224; 382/159; 382/203

(58) Field of Classification Search
None
See application file for complete search history.

(56) References Cited

U.S. PATENT DOCUMENTS

| | | | |
|---|---|---|---|
| 5,781,650 | A | 7/1998 | Lobo et al. |
| 5,835,616 | A | 11/1998 | Lobo et al. |
| 7,319,779 | B1 | 1/2008 | Mummareddy et al. |
| 7,505,621 | B1 | 3/2009 | Agrawal et al. |
| 7,912,246 | B1 | 3/2011 | Moon et al. |
| 8,000,505 | B2 | 8/2011 | Gallagher |
| 8,379,937 | B1 * | 2/2013 | Moon et al. ............... 382/118 |
| 2010/0066822 | A1 * | 3/2010 | Steinberg et al. ........... 348/77 |

OTHER PUBLICATIONS

Müller, "A System for Automatic Face Analysis Based on Statistical Shape and Texture Models," 2008, Diss. Technical University Munich, pp. 1-157.*

Luu et al, "Age Estimation using Active Appearance Models and Support Vector Machine Regression," 2009, Biometrics: Theory, Applications, and Systems, 2009. BTAS'09. IEEE 3rd International Conference on, pp. 1-5.*

Wang, Yishi et al., "Gender Classification from Infants to Seniors", Proceedings of the IEEE Conference on Biometrics: Theory, Applications, and Systems (BTAS), Washington, D.C., Sep. 27-29, 2010, p. 1-6.

Luu, Khoa et al., "Combined Local and Holistic Facial Features for Age-Determination", Proceedings of the 11th International Conference on Control, Automation, Robotics and Vision, Singapore, Dec. 7-10, 2010, p. 900-904.

Ricanek, Karl et al., "Unconstrained Biometric Identification: Emerging Technologies", Computer Magazine, vol. 43 No. 3, pp. 56-62, Feb. 2010.

(Continued)

*Primary Examiner* — Barry Drennan
*Assistant Examiner* — David F Dunphy
(74) *Attorney, Agent, or Firm* — McDonnell Boehnen Hulbert & Berghoff LLP

(57) ABSTRACT

A facial image may be annotated with the plurality of facial landmarks. These facial landmarks may be points or regions of the face that are indicative, either alone or in combination with other facial landmarks, of at least one demographic characteristic. Demographic characteristics include, for example, age, race, and/or gender. Based on the demographic characteristic being analyzed, one or more of these facial landmarks may be selected and arranged into an input vector. Then, the input vector may be compared to one or more of the training vectors. An outcome of this comparison may involve in the given facial image being classified into a category germane to the analyzed demographic characteristic (e.g., an age range or age, a racial category, and/or a gender).

14 Claims, 7 Drawing Sheets

(56) References Cited

OTHER PUBLICATIONS

Guo, Guodong et al., "Cross-Age Face Recognition on a Very Large Database: The Performance Versus Age Intervals and Improvement Using Soft Biometric Traits", in the Proceedings of IAPR 20th International Conference on Pattern Recognition (ICPR 2010), Istanbul Turkey, Aug. 2010, pp. 3392-3395.

Luu, K. et al. "Spectral Regression based Age Determination", IEEE Computer Society Workshop on Biometrics, in association with the 23th IEEE Conf. on Computer Vision and Pattern Recognition (CVPR 2010), San Francisco, Jun. 2010, pp. 103-107.

Sethuram, Amrutha et al., "A Hierarchical Approach to Facial Aging", in the Proceedings of IEEE Computer Society Workshop on AMFG, in association with the 23th IEEE Conf. on Computer Vision and Pattern Recognition (CVPR 2010), San Francisco, Jun. 2010, pp. 100-107.

Chen, Cuixian et al., "Face Age Estimation Using Model Selection", in the Proceedings of IEEE Computer Society Workshop on AMFG, in association with the 23th IEEE Conf. on Computer Vision and Pattern Recognition (CVPR 2010), San Francisco, Jun. 2010, pp. 93-99.

Edwards et al., "Advances in Active Appearance Models," The Proceedings of the Seventh IEEE International Conference on Computer Vision, vol. 1, pp. 137-142, 1999.

Burges, Christopher J.C., "A Tutorial on Support Vector Machines for Pattern Recognition," Data Mining and Knowledge Discovery 2, pp. 121-167, 1998.

Luu, Khoa et al. "Automatic Child-Face Age Progression Based on Heritability Factors of Familial Faces", The First IEEE International Conference on Biometrics, Identity and Security (BIDS), Tampa, Fl, Sep. 2009, pp. 1-6.

Luu, Khoa et al. "Age Estimation using Active Appearance Models and Support Vector Machine Regression", IEEE Third International Conference on Biometrics: Theory, Applications and Systems (BTAS), Washington DC, Sep. 2009, pp. 1-5.

Patterson, Eric et al., "Improvements in Active Appearance Models Synthetic Age Progression for Adult Aging", Proceedings of the IEEE Conference on Biometrics: Theory, Applications, and Systems (BTAS), Washington, D.C., Sep. 28-30, 2009, pp. 1-5.

Ricanek, Karl et al., "Generalized MultiEthnic Age Estimation", in the Proceedings of the IEEE Conference on Biometrics: Theory, Applications, and Systems (BTAS), Washington, D.C., Sep. 2009, pp. 1-6.

Cootes, T. F. et al., "Active Appearance Models," IEEE Transactions on Pattern Analysis and Machine Intelligence, vol. 23, No. 6, pp. 681-685, Jun. 2001.

Yan, S. et al., "Ranking with Uncertain Labels," ICME, pp. 96-99, 2007.

Smola, A. et al., "A tutorial on support vector regression," Technical Report TR-1998-030, Neuro Colt Royal Holloway College, 1998, pp. 1-24.

Cootes, T. F. et al., "Active Shape Models—Their training and Application," Computer Vision Graphics and Image Understanding, vol. 61, No. 1, pp. 38-59, 1995.

Albert, A. Midori et al., "The MORPH Database: Investigating the Effects of Adult Craniofacial Aging on Automated Face-Recognition Technology", Journal of Forensic Science Communications, Research and Technology, vol. 10, No. 2, Apr. 2008, 7 pages.

Patterson, Eric et al., "Aspects of Age Variation in Facial Morphology Affecting Biometrics," Proceedings of the IEEE Conference on Biometrics: Theory, Applications, and Systems, Washington, D.C., Sep. 2007, pp. 1-6.

Patterson, Eric et al., "Comparison of Synthetic Face Aging to Age Progression by Forensic Sketch Artist," Proceedings of the Seventh IASTED International Conference on Visualization, Imaging, and Image Processing, ACTA Press, pp. 247-252, Palma de Mallorca, Spain, Aug. 2007.

Ricanek, K. et al., "A Novel Cognitive Psychology Based Face Recognition System for Improved Identication Rates for the Problem of Age-Progression," Proceedings of the Seventh IASTED International Conference on Visualization, Imaging, and Image Processing, ACTA Press, pp. 289-294, Palma de Mallorca, Spain, Aug. 2007.

Albert, A. Midori et al., "A review of the literature on the aging adult skull and face: Implications for forensic science research and applications," Journal of Forensic Science International, Apr. 16, 2007, pp. 1-9, (http://www.sciencedirect.com/science/article/B6T6W-4NH6N87-4/2/32387a10f5d792b909910ac112f32a6c).

Patterson, Eric et al., "Automatic Representation of Adult Aging in Facial Images," Proc. 6th IASTED International Conference on Visualization, Imaging, and Image Processing, Palma de Mallorca, Spain, Aug. 2006, pp. 171-176.

Edwards, G. J. et al., "Interpreting Face Images using Active Appearance Models," 3rd IEEE International Conference on Automatic Face and Gesture Recognition, Apr. 14-16, 1998, pp. 300-305.

Ricanek, K. et al., "MORPH: A Longitudinal Image Database of Normal Adult Age-Progression," IEEE 7th International Conference on Automatic Face and Gesture Recognition, Southampton, UK, Apr. 2006, pp. 341-345.

Ricanek, K. et al., "The Effect of Normal Adult Aging on Standard PCA Face Recognition Accuracy Rates," International Joint Conference on Neural Networks, Montreal, Canada, Jul. 2005, pp. 2018-2023.

Edwards, G. J. et al., "Face Recognition Using Active Appearance Models," ECCV, vol. 2, pp. 581-595, 1998.

Geng, X. et al., "Automatic age estimation based on facial aging patterns," PAMI, vol.29, No. 12, pp. 2234-2240, 2007.

Ricanek, K. et al., "Hybrid Hopfield Network for Pattern Recognition and Face Recognition," IASTED International Conference on Artificial Intelligence and Soft Computing, Honolulu, Hawaii, Aug. 1999.

Rhodes, M. G., "Age Estimation of Faces: A Review," Applied Cognitive Psychology, vol. 23, pp. 1-12, 2008.

Cootes, T. F. et al., "Active Appearance Models," ECCV, 1998, pp. 1-16.

Kwon, Y.H. et al., "Age Classification from facial images," Computer Vision and Image Understanding, vol. 74, pp. 1-21, Apr. 1999.

Horng, W. B. et al., "Classification of Age Groups Based on Facial Features," Tamkang Journal of Science and Engineering, vol. 4, No. 3, pp. 183-192, 2001.

Hayashi, J. et al., "Age and Gender Estimation from Facial Image Processing," 41st SICE Annual Conference, vol. 1, pp. 13-18, Aug. 2002.

Yan, S. et al., "Extracting Age Information from Local Spatially Flexible Patches," ICASSP, 2008, pp. 737-740.

Zhuang, X. et al., "Face Age Estimation Using Patch-based Hidden Markov Model Supervectors," ICPR, Dec. 8-11, 2008, pp. 1-4.

Yan, S. et al., "Regression from Patch-Kernel," ICPR, Jun. 23-28, 2008, pp. 1-8.

Lanitis A., "Comparative Evaluation of Automatic Age-Progression Methodologies," EURASIP Journal on Advances in Signal Processing, vol. 8, Issue 2, Jan. 2008, pp. 1-10.

Lanitis A. et al., "Modeling the process of ageing in face images," ICCV, vol. 1, pp. 131-136, 1999.

Ricanek, Karl "Hierarchical Face Age-Estimation Algorithm Using Informed Facial Features", in the Proceedings of 19th Annual International Annie, St. Louis, MO, Nov. 2009.

Rawls, Allen et al., "MORPH: Development and Optimization of a Longitudinal Age Progression Face Database", BioID_MultiComm'09 Proceedings of the 2009 Joint COST 2101 and 2102 International Conference on Biometric ID Management and Multimodal Communication, Sep. 2009, pp. 17-24.

Sethrum, A. et al., "Improvements and Performance Evaluation Concerning Synthetic Age Progression and Face Recognition Affected by Adult Aging", Proceedings of the Third IAPR International Conference on Biometrics (ICB), LNCS 5558, Jun. 2009, pp. 62-71.

Ricanek, K. et al., "Craniofacial Aging on the Eigenface Biometric," Proc. 6th International Association of Science and Technology for Development International Conference on Visualization, Imaging, and Image Processing, Palma de Mallorca, Spain, Aug. 2006, pp. 249-253.

Ricanek, K. et al., "Landmark Based Statistical Measures for Face Recognition," Hawaiian International Conference on Statistics, Honolulu, Hawaii, Jan. 2005 (Abstract).

(56) References Cited

OTHER PUBLICATIONS

Ricanek, K. et al., "Hopfield Like Networks for Pattern Recognition with Applications to Face Recognition," International Joint Conference on Neural Networks, Jul. 10-16, 1999, pp. 3265-3269.

Kwon, Y.H. et al., Locating facial features for age classification, in proceedings of SPIE—the International Society for Optical Engineering, vol. 2055, pp. 62-72, 1993.

Vapnik, Vladimir N., "Chapter 11—The Support Vector Method for Estimating Real-Valued Functions," Statistical Learning Theory, 1998, pp. 443-492, John Wiley & Sons, Inc., New York.

Vapnik, Vladimir N., "Chapter 12—SV Machines for Pattern Recognition," Statistical Learning Theory, 1998, pp. 493-520, John Wiley & Sons, Inc., New York.

\* cited by examiner

DEMOGRAPHIC ANALYSIS OF FACIAL LANDMARKS

BACKGROUND

In recent years, digital photography has become the preferred method of capturing still pictures. Due to the availability of low-cost, large-scale storage media, it has grown to the point that there are billions of digital photographs on the Internet. In addition to personal collections of digital photos, private, public and government entities may collect and store digital photographs for personal, commercial, security, and other purposes. Many of these digital photographs depict the faces of one or more persons.

OVERVIEW

It is desirable to be able to estimate demographic characteristics (e.g., age, race, gender, etc.) of persons from facial images in the digital photographs. However, current proposals exhibit a lack of accuracy to determine race, gender, or age within several years.

In order to more accurately estimate the demographic characteristics of individuals depicted in digital photographs, methods and devices for demographic analysis of facial landmark data are presented herein. In particular, a plurality of facial landmarks may be selected from a set of facial images. Each respective facial landmark may represent an anthropometric feature of the face depicted in the image. For each facial image, a vector of selected facial landmarks may be mapped to a known demographic characteristic of the individual depicted in the image. This information may then be used as training vectors for estimating the demographic characteristics of additional facial images.

In particular, a given facial image may be annotated with the plurality of facial landmarks. These facial landmarks may be points or regions of the face that are indicative, either alone or in combination with other facial landmarks, of at least one demographic characteristic. Based on the demographic characteristic being analyzed, one or more of these facial landmarks may be selected and arranged into an input vector. Then, the input vector may be compared to one or more of the training vectors. An outcome of this comparison may involve in the given facial image being classified into a category germane to the analyzed demographic characteristic (e.g., an age range or age, a racial category, and/or a gender).

For instance, if age is being estimated, the input vector may be classified into a perceptual or chronological age range (e.g., 24.0-24.5 years of old), or an exact age value (e.g., 34.6 years old). Likewise, if race is being estimated, the input vector may be classified into a racial category (e.g., Caucasian, Asian, African, etc.). Similarly, if gender is being estimated, the input vector may be classified into a gender category (e.g., male or female).

For some types of demographic characteristics, a second classification may then take place, estimating where within the category the facial image falls. For example, if the given facial image maps to an age range of 21-30 years, then second classification may provide an estimated age of the facial image (e.g., 25 years).

These estimations may be comprised of various types of regression, goodness-of-fit and/or maximum likelihood estimation techniques. For instance, the first classification may include using a support vector machine (SVM) to fit the input vector into categories defined by the training vectors, and the second classification may include using a support vector regression (SVR) to map the input vector to a particular result based on the training vectors that fall into the same category as the input vector.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DESCRIPTION

I. Introduction

Figure 1:
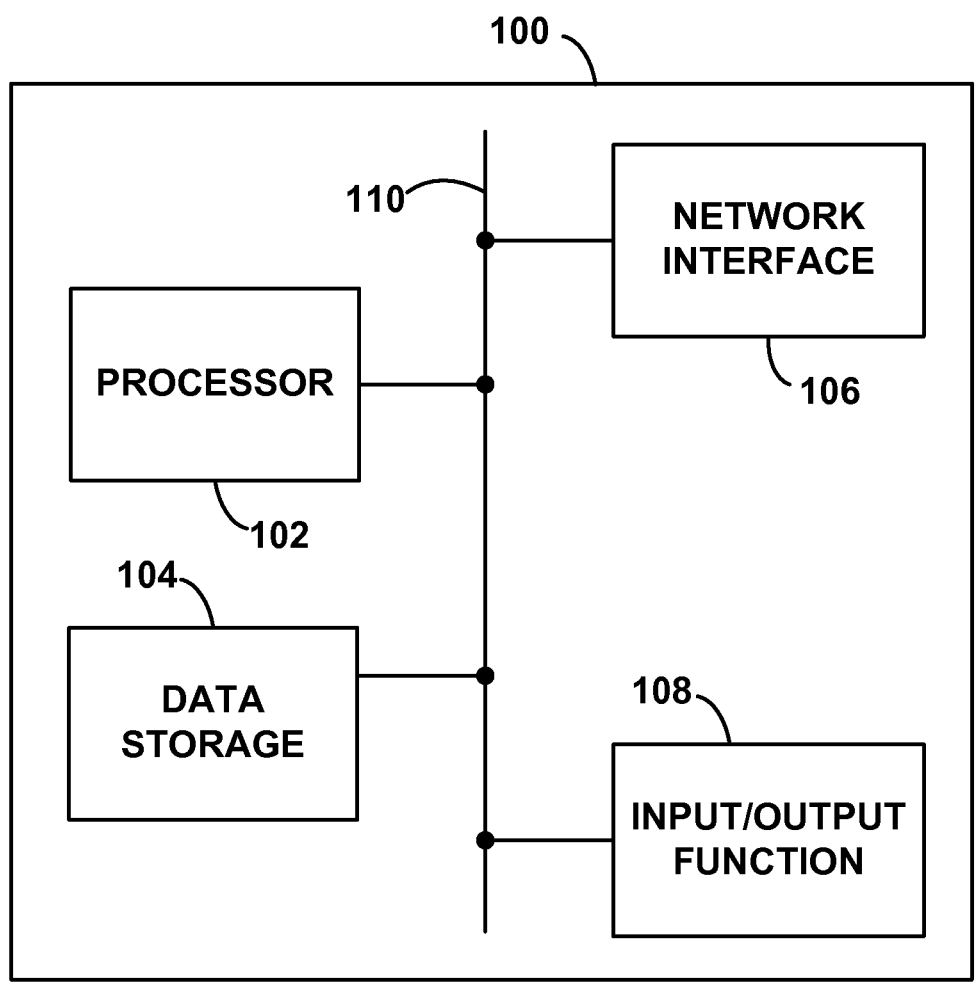
FIG. 1 is a block diagram of a computing device, in accordance with an example embodiment.

Human facial characteristics vary dramatically across ages, races, and genders. As just one example, the bio-dynamics of facial aging may be different for various ranges of age. In addition to idiosyncratic aging factors that affect the appearance of different individuals, facial aging may also be influenced by age-related biomechanical factors that affect all individuals. For instance, the facial aging of children is typically dominated by the lengthening and widening of cranial bone structure (e.g., bone expansion and/or or hard-tissue elongation), while the facial aging of adults is mostly driven by the wrinkling, creasing, and lining of skin, sagging of soft tissues, thinning of fat pads, and bone-remodeling of specific facial cranial structures.

In particular, young children typically have high foreheads, small noses, and small jaw bones. However, their eyes may appear large compared to the rest of their faces. The skin of children is typically smooth and firm. As children age, their foreheads become more sloped, their noses and jaws lengthen, and their eyes become proportionally smaller due to the lengthening and widening of other facial components.

While most growth stops at approximately 20 years of age, individuals' faces continue to change. In particular, nose and ear soft tissue often continues to grow. Also, the amount of fatty tissue supporting the face decreases, leading to drooping and/sagging of features. Skin also changes in texture and appearance. There may be a decrease in the amount of water in the skin, which leads to wrinkling, and hyper-pigmentation (e.g., age spots) may appear. Areas of the face changes due to bone resorption through remodeling as in the mandible region which changes for senior adults regardless of tooth loss, which was until recently believed to be the primary driver of mandible remodeling.

Wrinkling often begins during or before middle age, and increases with maturity. Thus, by the time individuals reach old age, their faces may be quite wrinkled. In addition, their hair may grey and become thin, their eyebrows may become thicker, hyper-pigmentation may continue, and they may lose teeth.

On the other hand, some facial features are comparatively static throughout an individual's life. For instance, the relative distance between the eyes is typically set at birth and does not change as a person ages.

Age is just one demographic characteristic that is indicated by facial features. Gender and race are two other demographic characteristics that may be determined through the analysis of these facial features. However, different subsets (though not necessarily disjoint subsets) of facial features may be best suited to estimate the age, gender, or race of a facial image. Therefore, in order to accurately estimate the demographic characteristics of a given facial image, it may be helpful to take age-specific, race-specific, and/or gender-specific facial characteristics into account. As a result, better models of facial images may be built, and more accurate age, race, and gender estimation may be performed.

The uses for these types of estimations are many-fold. For example, entities providing public security functions (e.g., local, state, and federal law enforcement agencies) may be given a general description of a person of interest (e.g., a white male between the ages of 25 and 35). These entities may have access to dozen, hundreds, or thousands of digital photographs, some of which are suspected to contain pictures of this person's face. By making use of the embodiments herein, the number of photographs to consider may be reduced to a much smaller total by estimating the age, race, and/or gender of faces in these digital photographs.

However, this is not the only possible application for these embodiments. For instance, accurate age estimation is desirable in any situation where age verification is used to determine a qualification or legal status. To that point, casinos and bars may seek to verify that patrons are over the age at which they may legally consume alcohol, a youth sports organization may seek to verify that a participant's age is below a certain limit or within a certain range, and professional sports organizations may seek to verify that an athlete's age is above a certain limit or within a certain range.

In order to rapidly manipulate a potentially large number of digitally-represented facial images, one or more computing devices may be employed. FIG. 1 is a simplified block diagram exemplifying a computing device 100, illustrating some of the functional components that would likely be found in a computing device arranged to operate in accordance with the embodiments herein. Example computing device 100 could be a personal computer, wireless communication device, server device, mainframe device, and so on. Thus, the description of computing device 100 could apply to any combination of software and hardware used for the purposes described herein.

Example computing device 100 preferably includes a processor 102, data storage 104, a network interface 106, and an input/output function 108, all of which may be coupled by a system bus 110 or a similar mechanism. Processor 102 preferably includes one or more central processing units (CPUs), such as one or more general purpose processors and/or one or more dedicated processors (e.g., application specific integrated circuits (ASICs) or digital signal processors (DSPs), etc.).

Data storage 104, in turn, may comprise volatile and/or non-volatile data storage and can be integrated in whole or in part with processor 102. Data storage 104 preferably holds program instructions, executable by processor 102, and data that is manipulated by these instructions to carry out the various methods, processes, or functions described herein. Alternatively, these methods, processes, or functions can be defined by hardware, firmware, and/or any combination of hardware, firmware and software.

Accordingly, any of the methods processes, or functions disclosed in this specification or the accompanying drawings may be represented as program instructions on any appropriate computer-readable medium. Thus, embodiments of this invention encompass an article of manufacture, including a non-transitory computer-readable medium, having program instructions stored thereon that, in response to execution by a computing device, cause the computing device to perform operations comprising any of these methods, processes, or functions.

Network interface 106 may take the form of a wireline connection, such as an Ethernet, Token Ring, or T-carrier connection. Network interface 106 may also take the form of a wireless connection, such as IEEE 802.11 (Wifi), BLUETOOTH®, or a wide-area wireless connection. However, other forms of physical layer connections and other types of standard or proprietary communication protocols may be used over network interface 106. Furthermore, network interface 106 may comprise multiple physical interfaces.

Input/output function 108 may facilitate user interaction with example computing device 100. Thus, input/output function 108 may comprise multiple types of input devices, such as a keyboard, a mouse, a touch screen, and so on. Similarly, input/output function 108 may comprise multiple types of output devices, such as a monitor, printer, and/or one or more light emitting diodes (LEDs). Additionally or alternatively, example computing device 100 may support remote access from another device, via network interface 106 or via another interface (not shown), such an RS-232 or universal serial bus (USB) port.

II. Facial Landmark Representation

Figure 2:
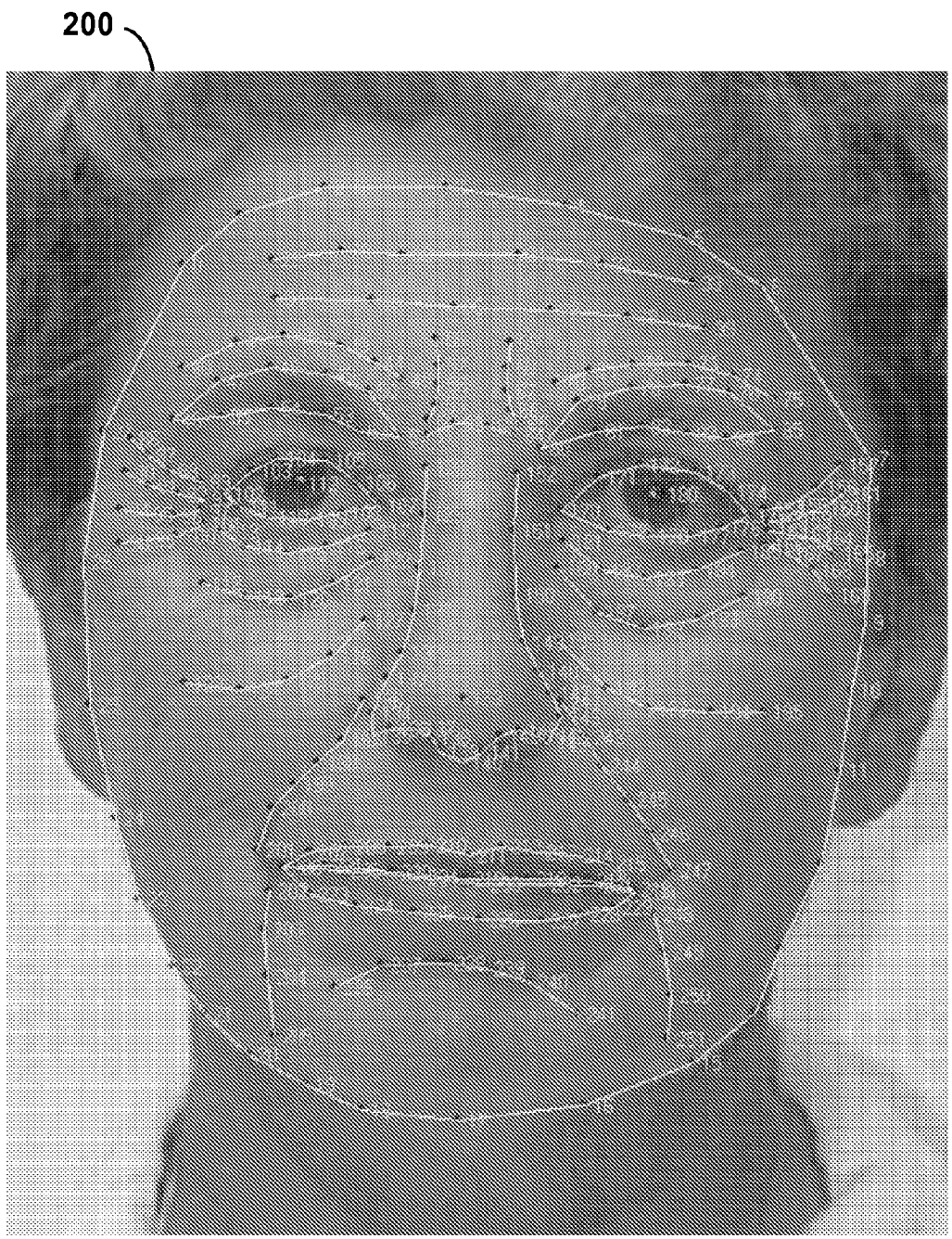
FIG. 2 is a digital photograph of a face, along with a set of facial landmarks, in accordance with an example embodiment.

FIG. 2 is an example digital photograph 200 of a face that is annotated with a set of 252 facial landmarks. In general, such a facial image can be annotated with any number of facial landmarks. Accordingly, the number of facial landmarks used in the embodiments herein may be less than or greater than the 252 facial landmarks shown in FIG. 2.

Facial landmarks may be chosen based on their ability to estimate the age, race and/or gender, either alone or in combination with one another. Thus, by examining a relatively small number of facial landmarks (e.g., a few dozen or a few hundred out of thousands of potential facial landmarks), a reasonably accurate estimate of these demographics can be obtained. Further, the facial landmarks most useful for respective estimation of age, race, and/or gender may differ. Therefore, out of the 252 facial landmarks in FIG. 2, one set of 30 may be chosen for age estimation, another set of 30 may be chosen for race estimation, and yet another 30 may be chosen for gender estimation. (It should be understood that these numbers are provided for purposes of illustration, and that a different number of facial landmarks may be chosen to estimate each demographic.) One tool for choosing these facial landmarks is to use an active appearance model (AAM), which can be used to identify areas in facial images that account for significant amounts of anthropometric variation between different facial images.

Regardless, once a set of facial landmarks are chosen, they may be represented as a vector. Each such vector may contain a plurality of values (e.g., numeric values), each associated with a facial landmark of a given facial image. Thus, for instance, particular values might represent the shape of the facial landmark, the intensity and/or coloration of pixels at or near the facial landmark, the distance of the facial landmark from another point on the face, or some other aspect of the given facial image. As a result of this form of representation, these vectors may be manipulated by a computing device, such as computing device 100, to produce an age, race, and/or gender estimation.

III. Demographic Estimation

The embodiments herein may encompass machine learning techniques to provide at least some aspects of demographic estimation. One way in which to estimate a demographic characteristic of a given facial image is to compare this facial image to a plurality of facial images each of which having known demographic value(s). The result of this comparison may be an estimate of one or more demographic characteristics of the given facial image.

Throughout this specification, example embodiments of age estimation are used. It should be noted that the techniques herein can also be used to estimate race and gender, as well as other types of demographics. Thus, these methods, processes, and functions of these example embodiments are not limited to age estimation, and may be used, in whole or in part, for other purposes as well.

a. Developing a Classification Function

For age estimation, a plurality of facial images, for each of which the actual age of the face is known, may be gathered and used as training data. This training data may be the basis of a function that classifies new facial images into two or more categories.

Based on the demographic characteristic being estimated (hereinafter also referred to as the "application"), a subset of facial landmarks may be chosen. For each facial image, the values associated with these chosen facial landmarks may be placed in a training vector. Thus, each of n training vectors may be represented by $x_i$, where i=1 . . . n. Preferably, $x_i$ is the training vector for the ith facial image, and $x_i$ contains m facial landmarks. Each training vector $x_i$ may also be associated with $age_i$, the actual age of the face represented in the facial image.

Further, each training vector $x_i$ may be mapped to an age range in which $age_i$ falls. For example, based on the observation that child and adult faces age differently, two age ranges may be established, one for the ages 0-20 and the other for the ages 21 and over. Then, each of these ranges may be associated with a unique value. For instance, the age range of 0-20 may be associated with a value of −1, while the age range of 21 and over may be associated with the value of 1. These values may be represented for each facial image by the variable $y_i$. Thus, a mapping $(x_i, y_i)$ may be established between each training vector and an age range indicator.

It should be understood that the number of age ranges, and the starting and ending points of each age range, may differ from the above example. Moreover, the values taken on by $y_i$ may be different than those presented above. For instance, the age ranges of 0-20, 21-55, and 55 and over could be used, and $y_i$ could accordingly take on one of three values for each facial image. Other age ranges could be used as well.

Regardless, once the values of the training vectors $x_i$ and the age range mappings $y_i$ are determined for each facial image in the training data, machine learning techniques may be used to model the commonalities between facial images that map to each age range. One way of doing so is to use an SVM-based representation of the training vectors. Continuing with the example of two age ranges, an SVM model may be used to select a subset of $n_s$ training vectors (hereinafter referred to as the "support vectors" and notated as $s_i$) such that the distance between support vectors $s_i$ in m-dimensional space is substantially maximized. Therefore, support vectors $s_i$ may comprise vectors that accentuate the difference between facial landmarks that map to the age range of 0-20 and facial landmarks that map to the age range 21 and over.

In a possible embodiment, the SVM model may involve finding support vectors $s_i$, as well as the coefficients $\alpha_i$ and b to fit the equation $$w \cdot x + b = 0$$

where x is the matrix of training vectors, · is the dot-product operation, and $$w = \sum_{i=1}^{N_s} \alpha_i y_i s_i.$$

In particular, it is desirable for the support vectors $s_i$ to be linearly separable. Points in a two-dimensional space are linearly separable if they can be separated by a line drawn between them. Thus, sets of points are linearly separable in m-dimensional space if they can be separated by a hyperplane of m−1 dimensions. If the points in training vectors $x_i$ are not linearly separable, they can be mapped, through use of mapping function Φ, to a Euclidian space H such that these points are linearly separable. Accordingly, support vectors as well as the coefficients $\alpha_i$ and b, may be found to fit the equation $$\sum_{i=1}^{N_s} \alpha_i y_i K(s_i, x) + b = 0$$

where the kernel function $K(a,\beta) = \Phi(a) \cdot \Phi(\beta)$. Values $\alpha_i$ and b are preferably a substantially optimal solution of a quadratic programming problem $$\min_{w,b,\xi} \frac{1}{2} \|w\|^2 + C \sum_{i=1}^{N_s} \xi_i$$

where C>0 is a regularization parameter, $\xi_i \geq 0$ and $y_i (w \cdot x_i + b) \geq 1 - \xi_i$ As a result, a classifier function $f(z)$ may be constructed to determine whether an input vector represents the face of a child (e.g., ages 0-20) or an adult (e.g., ages 21 and over). Accordingly, $$f(z) = \sum_{i=1}^{N_s} \alpha_i y_i K(s_i, z) + b$$

where z is the input vector and K is Gaussian kernel function $$K(a,\beta) = e^{-1/2\sigma 2 \|a - \beta\|^2}.$$

The value of standard deviation σ may on various values.

The output of function $f(z)$ is preferably between −1, indicating a child's face, and 1, indicating an adult's face. However, a function such as function $f(z)$ may output different values based on the number of range ranges defined. For instance, $f(z)$ may output different types or ranges of values when more than two age ranges are defined, thereby mapping the input vector z to one of the age ranges. In another possible embodiment, $f(z)$ may map the input vector z to more than one age range.

Figure 3:
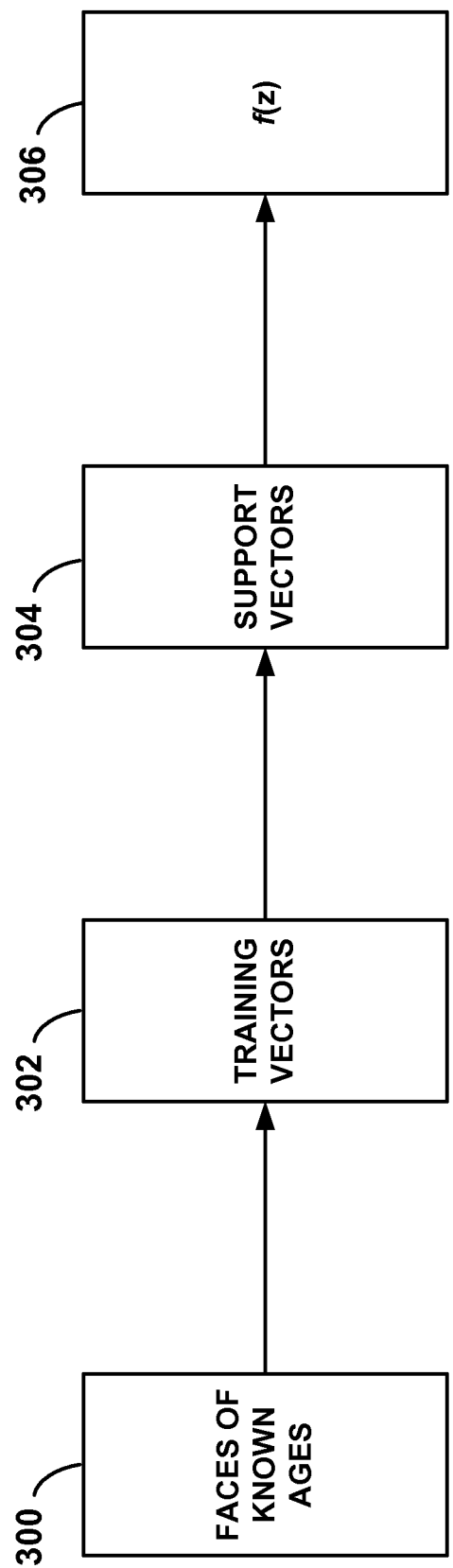
FIG. 3 is a workflow with which to construct an SVM, in accordance with an example embodiment.

FIG. 3 provides an example workflow of this classification process. Faces of known ages 300 may be processed to select facial landmarks, resulting in training vectors 302. Support vectors 304 may be selected from training vectors 302. An SVM may be developed from support vectors 304, resulting in a classification function $f(z)$. Given an input vector z based on a given facial image, $f(z)$ preferably produces a classification of the facial image into an age range.

It should be understood that the process depicted in FIG. 3 is presented for purposes of illustration. Thus, more or fewer components than are shown in FIG. 3 may be included, and these components may be arranged differently than is shown. Further, each component may be replaced with an equivalent or similar component without departing from the scope of the invention.

b. Fitting Classified Facial Images to Training Data

Once an input vector is classified, for example using a classification function as described above, the input vector may be compared to support vectors that represent faces with known ages within the classified age range. Thus, if the input vector is classified as representing the face of a child, the input vector may be compared to the support vectors representing faces with known ages from 0-20. But if the input vector is classified as representing the face of an adult, the input vector may be compared to the support vectors representing faces with known ages 21 and over. In a possible embodiment, this comparison may take the form of an SVR.

At a high level, the SVR technique is capable of building a hyperplane v that fits (e.g., is close to) the points in the training data. For the age estimation application, the training data is either the support vectors $s_i^c$ that represent children's faces, or the support vectors $s_i^a$ that represent adult faces. For a given subset of support vectors, $s_i^k$, v can be determined according to the equation $$|y_i - (v \cdot s_i^k + b)|_\varepsilon = \begin{cases} 0 & \text{if } |y_i - (v \cdot s_i^k + b)| < \varepsilon \\ |y_i - (v \cdot s_i^k + b)| - \varepsilon & \text{otherwise} \end{cases}$$

where the value of $\varepsilon$ can be varied, and may be an input parameter of the SVR calculation. In a possible embodiment $\varepsilon$ may take on a value of 0.05, but other values of $\varepsilon$ may be used instead.

The SVR may be determined by solving the quadratic programming problem characterized by the equations $$\min_{w,b,\xi,\xi^*} \frac{1}{2}\|v\|^2 + C\sum_{i=1}^{N_s} (\xi_i + \xi_i^*)$$

$$y_i - (v \cdot s_i^k + b) \leq \varepsilon + \xi_i$$

$$-y_i - (v \cdot s_i^k + b) \leq \varepsilon + \xi_i^*$$

preferably where C>0 is a regularization parameter, $\xi_i \geq 0$, and $\xi_i^* \geq 0$.

Using these quadratic programming equations, a function $f(s_i^k, z)$ can be developed to, based on the known ages of support vectors $s_i^k$, estimate the age of the facial image represented by input vector z. Therefore, a growth and development function $f(s_i^c, z)$ can be developed to estimate the age of facial images classified as children, and an aging function $f(s_i^a, z)$ can be developed to estimate the age of facial images classified as adult.

Figure 4:
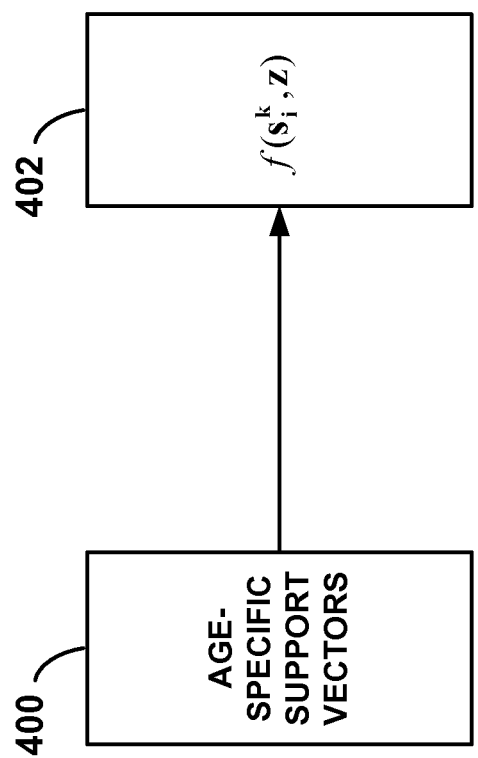
FIG. 4 is a workflow with which to construct an SVR function, in accordance with an example embodiment.

FIG. 4 provides an example workflow for how function $f(s_i^k, z)$ can be developed. Age-specific support vectors 400, e.g., either $s_i^c$ or $s_i^a$, are used to solve the quadratic programming problem. The result may comprise an age estimation function $f(s_i^k, z)$ 402.

Figure 5:
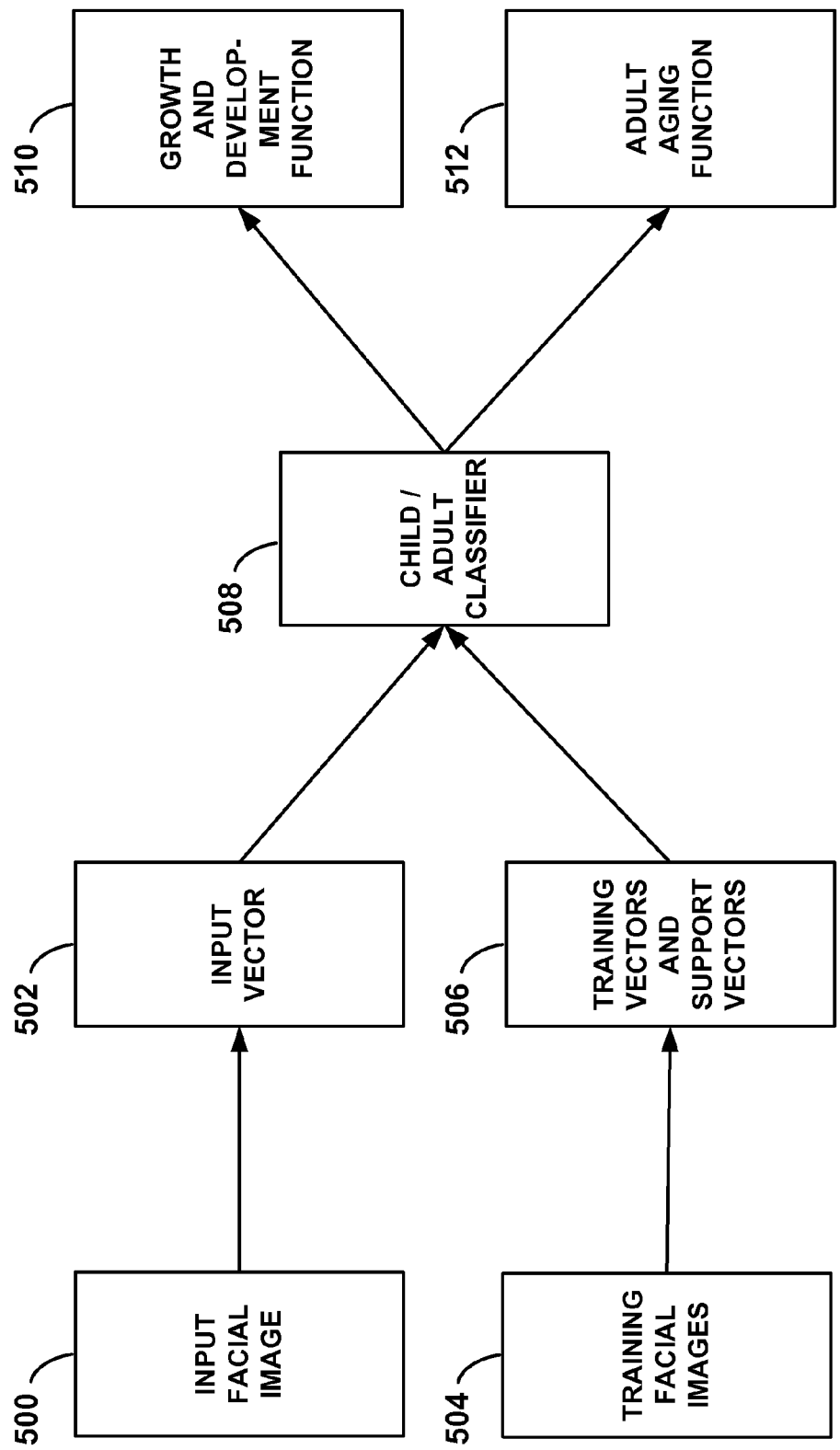
FIG. 5 is a workflow encompassing age classification and age estimation, in accordance with an example embodiment.

The combined workflow of developing a classification function and fitting classified facial images to training data is illustrated in FIG. 5. An input facial image 500 may be used to derive an input vector 502. Similarly, training facial images 504 may be used to derive training vectors and support vectors 506. Training vectors and support vectors 506 may be used, in turn, to develop child/adult classifier 508, which may be applied to input vector 502. Based on the output of child/adult classifier 508 applied to input vector 502, input vector 502 may then be used either with growth and development function 510 or adult aging function 512 to estimate the age of input facial image 500.

As in the case of FIG. 3, it should be understood that the workflows depicted in FIGS. 4 and 5 may presented for purposes of illustration. Thus, more or fewer components than are shown in FIGS. 4 and 5 may be included, and these components may be arranged differently than is shown. Further, each component may be replaced with an equivalent or similar component without departing from the scope of the invention. Moreover, there may be more than two age-specific support vectors defined, and accordingly, more than two age estimation functions.

c. Experimental Results

The accuracy of the demographic estimation techniques described herein can be evaluated in a number of ways. One such way of doing so is to use a mean absolute error (MAE) technique. MAE is the average absolute error between the actual demographic value and the estimated demographic value. Thus, for the case of age estimation, the MAE is the average absolute error between the actual age of a given facial image and the estimated age of the given facial image. More formally, MAE can be expressed as $$MAE = \frac{1}{n}\sum_{i=1}^{n} |age_i^{est} - age_i^{act}|$$

for a set of n facial images, where $age_i^{est}$ is the estimated age of the ith facial image and $age_i^{act}$ is the actual age of the ith facial image.

Additionally, the cumulative score technique may also be used to evaluate the accuracy of a demographic estimation technique. Cumulative score may be defined as $$CumScore(\theta) = \frac{n_{e<\theta}}{n} \times 100$$

where n is the total number of facial images and $n_{e<\theta}$ is the number of facial images for which the estimation error (the difference between the estimated age and actual age) was less than $\theta$. Thus, the cumulative score produces a result between 0 and 100, where the closer the results are to 100, the lower the estimation error.

The embodiments herein were evaluated against two different databases of facial images for which the age of each facial image was known. A set of 802 facial images was used as training data. Once an SVM and an SVR were built based on facial landmarks extracted from these facial images, the ages of each of the 802 facial images were estimated. The result was an overall MAE of less than 2. The same SVM and SVR were also used to estimate the ages of 200 additional facial images, and the resulting MAE was less than 3.96 years. The latter result was lower than any other publicly-available result for the same database of facial images, which indicates that the embodiments herein may result in superior age estimation accuracy.

The embodiments herein have also produced the best known age estimation per decade of life, with results as indicated in the table below.

| Years | MAE Per Decade |
|---|---|
| 0-9 | 2.12 |
| 10-19 | 4.23 |
| 20-29 | 5.67 |
| 30-39 | 9.58 |
| 40-49 | 10.29 |
| 50-59 | 9.51 |
| 60-69 | 21.25 | d. Example Methods

Figure 6:
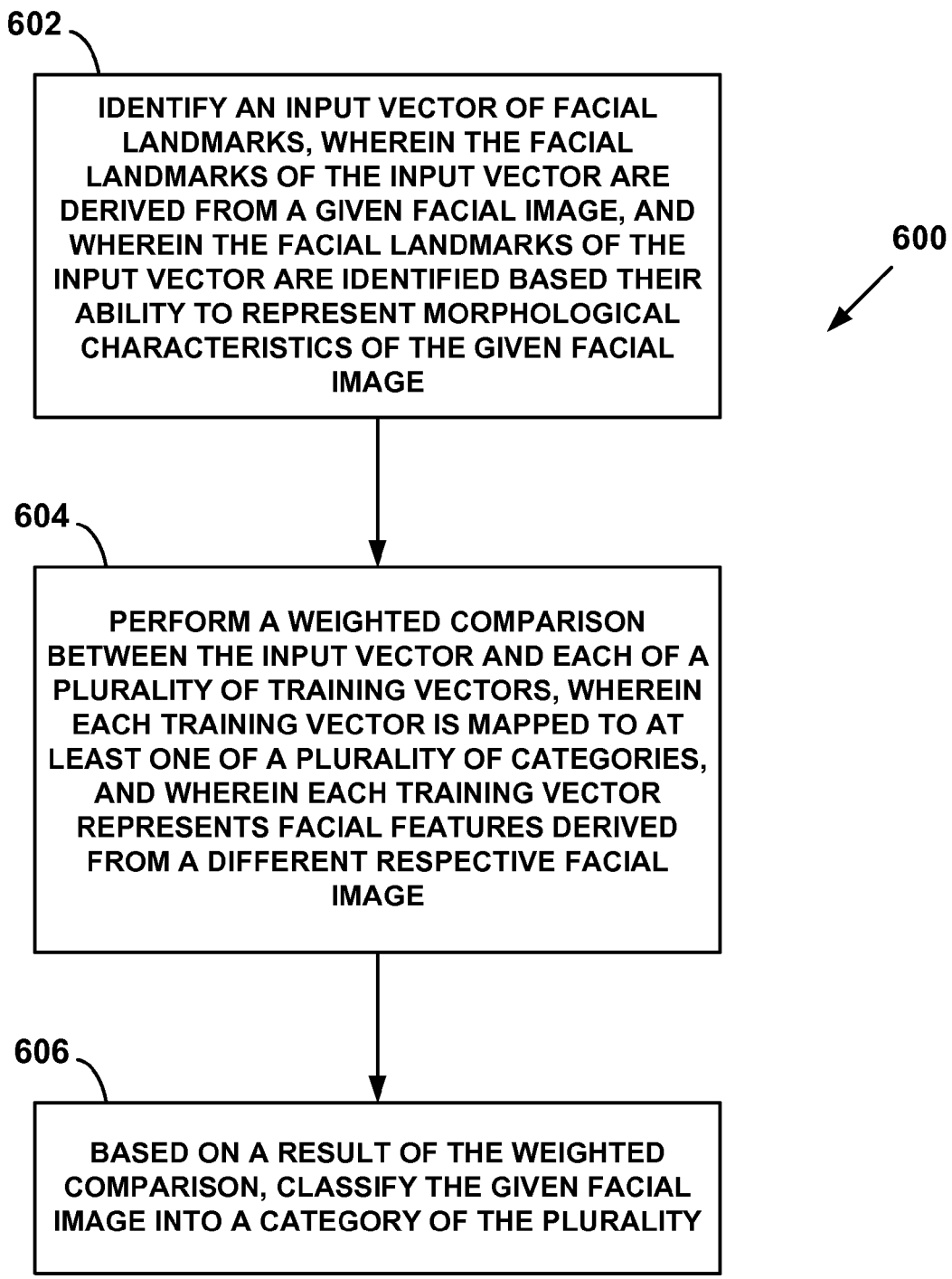
FIG. 6 is a flow chart, in accordance with an example embodiment.
Figure 7:
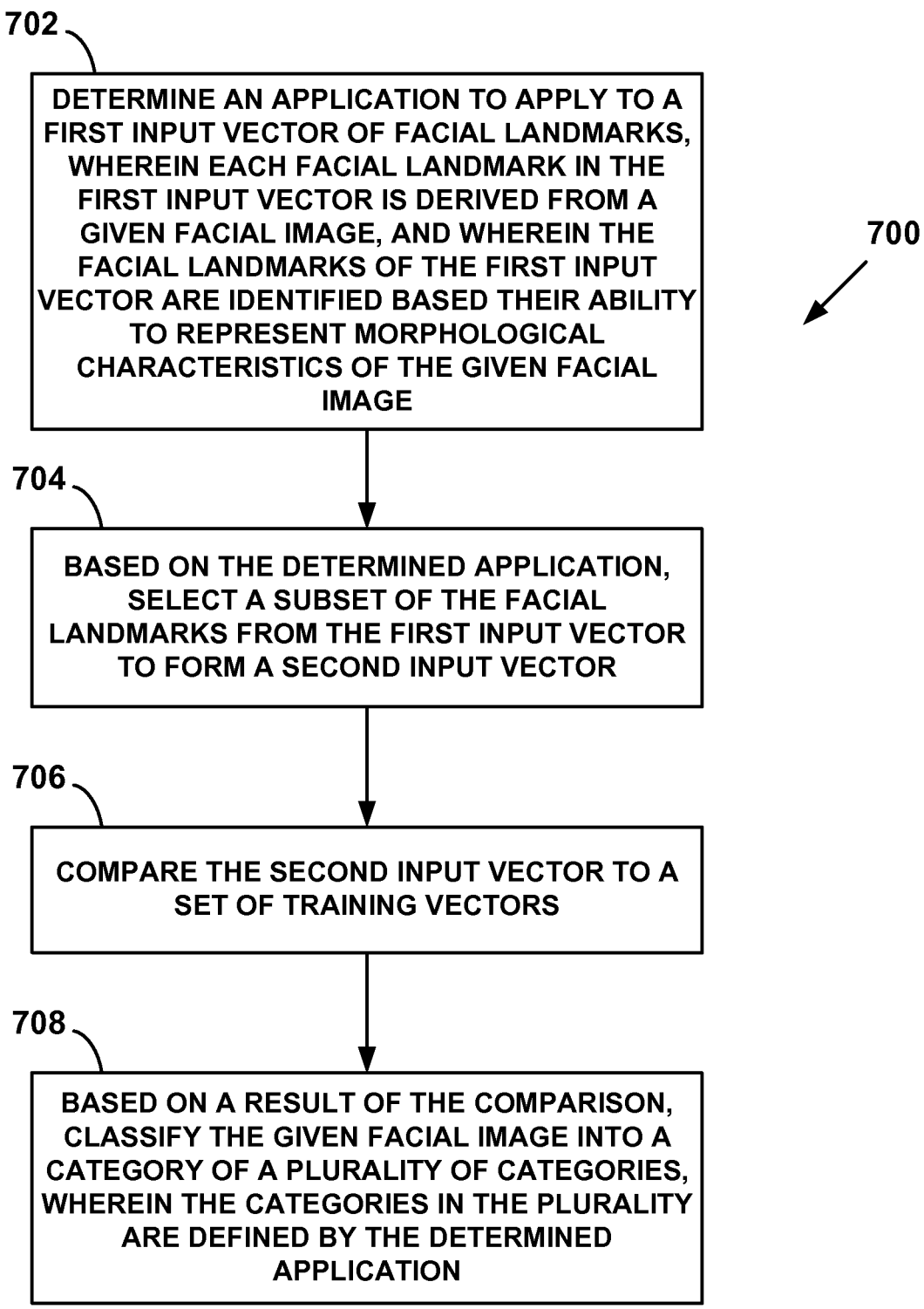
FIG. 7 is another flow chart, in accordance with an example embodiment.

FIGS. 6 and 7 provide flow charts 600 and 700, respectively, each in accordance with example embodiments described herein. However, these flow charts are presented for purposes of illustration. Thus, more or fewer steps than are shown in FIGS. 6 and 7 may take place, and these steps may occur in a different order. Additionally, the flow charts of FIGS. 6 and 7 may be combined, in part or in whole. Further, each step may be replaced with an equivalent or similar step without departing from the scope of the invention. Moreover, each of these flow charts may be performed, in whole or in part, by a computing device such as computing device 100.

According to a possible embodiment, at step 602 of method 600, an input vector of facial landmarks may be identified. The facial landmarks of the input vector may be derived from a given facial image. Preferably, these facial landmarks are identified based their ability to represent anthropometric characteristics of the given facial image. At step 604, a weighted comparison between the input vector and each of a plurality of training vectors may be performed. Each training vector may map to at least one of a plurality of categories, and each training vector may represent facial landmarks derived from a different respective facial image. At step 606, based on a result of the weighted comparison, the given facial image may be classified into a category of the plurality.

According to another possible embodiment, at step 702 of method 700, an application to apply to a first input vector of facial landmarks may be determined. Each facial landmark in the first input vector may be derived from a given facial image. The application may be, for example, an age estimation application, a gender estimation application, a race estimation application, or some other type of application that estimates demographic characteristics of the given facial image. The facial landmarks of the first input vector may be identified based their ability to represent anthropometric characteristics of the given facial image. At step 704, based on the determined application, a subset of the facial landmarks may be selected from the first input vector to form a second input vector. At step 706, the second input vector may be compared to a set of training vectors. At step 708, based on a result of the comparison, the given facial image may be classified into a category of a plurality of categories. Preferably, the categories in the plurality are defined by the determined application.

For either method 600 or 700, further additional features and/or steps may be applied. For instance, each training vector may also map to a region in m-dimensional space such that there is one region in the m-dimensional space defined for each category in the plurality. Then, performing the comparison between an input vector and the training vectors may comprise fitting the input vector to at least one of these regions. Additionally, classifying the given facial image into the category of the plurality may involve selecting the category of the plurality based on the at least one region in the m-dimensional space to which the input vector maps.

Also, each category in the plurality may be associated with a different human racial identity, a different gender, or a different age range, based on whether the embodiment is attempting to determine the race, gender, or age of the individual from whom the given facial image was derived. In these cases, at least some of the facial landmarks of the input vector may represent racial characteristics, gender characteristics, or age characteristics, respectively, of the given facial image.

If the embodiment is attempting to determine an age, then each training vector is preferably associated with an age of an individual from whom the different respective facial image was derived. Additionally, a second comparison of the input vector to a subset of the training vectors may be performed, where at least some of the subset of the training vectors map to the category of the plurality in which the given facial image was classified. Based on a result of the second comparison, an age of an individual from whom the given facial image was derived may be estimated. The second comparison may involve, for example, a regression-based fitting of the input vector to the at least some of the training vectors, and/or fitting the input vector to points in m-dimensional space that are defined by at least some of the training vectors.

Optionally, the plurality of categories may include a child age range. At least some of the subset of the training vectors that map to the child age range may represent facial features indicative of bone expansion or hard-tissue elongation. Further, the plurality of categories may include an adult age range. At least some of the subset of the training vectors that map to the adult age range may represent facial features indicative of wrinkling, hyper-pigmentation, or thinning of fat padding. Further discrete age ranges may be used in a similar fashion.

IV. Conclusion

Example embodiments have been described above. Those skilled in the art will understand, however, that changes and modifications may be made to these embodiments without departing from the true scope and spirit of the invention, which is defined by the claims.

What is claimed is:

1. A method comprising:
identifying an input vector of facial landmarks, wherein the facial landmarks of the input vector are derived from a given facial image and identified based on their ability to represent anthropometric characteristics of the given facial image;
performing, by a computing device, a weighted comparison between the input vector and each of a plurality of training vectors, wherein each training vector is mapped to at least one of a plurality of categories, wherein each training vector represents facial landmarks derived from a different respective facial image, wherein each category in the plurality of categories comprises a different age range, and wherein at least some of the facial landmarks of the input vector represent aging characteristics of the given facial image, and wherein each training vector is associated with an age of an individual from whom the different respective facial image was derived;

based on a result of the weighted comparison, classifying the given facial image into a category of the plurality;

performing a second comparison of the input vector to a subset of the training vectors, wherein at least some of the subset of the training vectors map to the category of the plurality of categories in which the given facial image was classified, and wherein the plurality of categories comprises a child age range, and wherein at least some of the subset of the training vectors that map to the child age range represent facial features indicative of bone expansion or hard-tissue elongation; and based on a result of the second comparison, estimating an age of an individual from whom the given facial image was derived.

2. The method of claim 1, wherein each training vector also maps to a region in an m-dimensional space, wherein there is one region in the m-dimensional space for each category in the plurality, wherein performing the weighted comparison comprises mapping the input vector to at least one of the regions.

3. The method of claim 2, wherein classifying the given facial image into the category of the plurality comprises selecting the category of the plurality based on the at least one region in the m-dimensional space to which the input vector maps.

4. The method of claim 1, wherein each category in the plurality of categories also comprises a different human racial identity, and wherein at least some of the facial landmarks of the input vector represent racial characteristics of the given facial image.

5. The method of claim 1, wherein each category in the plurality of categories also comprises a different gender, and wherein at least some of the facial landmarks of the input vector represent gender characteristics of the given facial image.

6. The method of claim 1, wherein the plurality of categories also comprises an adult age range, and wherein at least some of the subset of the training vectors that map to the adult age range represent facial features indicative of wrinkling, hyper-pigmentation, or thinning of fat padding.

7. The method of claim 1, wherein the second comparison comprises fitting the input vector to points in m-dimensional space, wherein the points in the m-dimensional space are defined by the at least some of the training vectors.

8. The method of claim 1, wherein a mean absolute error of the estimated ages of respective individuals and actual ages of the respective individuals is less than about 4 years.

9. A method comprising:

determining an application to apply to a first input vector of facial landmarks, wherein each facial landmark in the first input vector is derived from a given facial image, and wherein the facial landmarks of the first input vector are identified based on their ability to represent anthropometric characteristics of the given facial image;

based on the determined application, selecting a subset of the facial landmarks from the first input vector to form a second input vector;

comparing, by a computing device, the second input vector to a set of training vectors, wherein each training vector is associated with an age of an individual from whom a different respective facial image was derived;

based on a result of the comparison, classifying the given facial image into a category of a plurality of categories, wherein the categories in the plurality are defined by the determined application, wherein each category in the plurality of categories comprises a different age range, wherein at least some of the facial landmarks of the second input vector represent age characteristics of the given facial image, wherein the plurality of categories comprises an adult age range, and wherein at least some of the subset of the training vectors that map to the adult age range represent facial features indicative of wrinkling, hyper-pigmentation, or thinning of fat padding;

performing a comparison of the second input vector to a subset of the training vectors, wherein at least some of the subset of the training vectors map to the category of the plurality of categories in which the given facial image was classified; and based on a result of the second comparison, estimating an age of an individual from whom the given facial image was derived.

10. The method of claim 9, wherein each training vector is mapped to at least one category of the plurality, and wherein each training vector represents facial landmarks derived from a different respective facial image.

11. The method of claim 9, wherein each training vector is mapped to a region in an m-dimensional space, wherein there is one region in the m-dimensional space for each category in the plurality, wherein performing the weighted comparison comprises fitting the input vector to at least one of the regions.

12. The method of claim 9, wherein classifying the given facial image into the category of the plurality of categories comprises selecting the category of the plurality of categories based on the at least one region in m-dimensional space to which the input vector maps.

13. The method of claim 9, wherein the plurality of categories also comprises a child age range, and wherein at least some of the subset of the training vectors that map to the child age range represent facial features indicative of bone expansion or hard-tissue elongation.

14. An article of manufacture including a non-transitory computer-readable medium, having stored thereon software instructions that, when executed by a computing device, cause the computing device to perform operations comprising:

identifying an input vector of facial landmarks, wherein the facial landmarks of the input vector are derived from a given facial image, and wherein the facial landmarks of the input vector are identified based on their ability to represent anthropometric characteristics of the given facial image;

performing a weighted comparison between the input vector and each of a plurality of training vectors, wherein each training vector is mapped to at least one of a plurality of categories, wherein each training vector represents facial landmarks derived from a different respective facial image, wherein each category in the plurality of categories comprises a different age range, and wherein at least some of the facial landmarks of the input vector represent aging characteristics of the given facial image, and wherein each training vector is associated with an age of an individual from whom the different respective facial image was derived;

based on a result of the weighted comparison, classifying the given facial image into a category of the plurality;

performing a second comparison of the input vector to a subset of the training vectors, wherein at least some of the subset of the training vectors map to the category of the plurality of categories in which the given facial image was classified, wherein the plurality of categories comprises a child age range, and wherein at least some of the subset of the training vectors that map to the child age range represent facial features indicative of bone expansion or hard-tissue elongation; and based on a result of the second comparison, estimating an age of an individual from whom the given facial image was derived.

* * * * *